United States Patent [19]

Makeev et al.

[11] 4,077,287

[45] Mar. 7, 1978

[54] APPARATUS FOR CROSS CUTTING COILED STRIP INTO RECTANGULAR AND OBLIQUE ANGLED PLATES AND CUTTING OFF ACUTE ANGLES

[76] Inventors: Boris Anatolievich Makeev, ulitsa Novgorodskaya, 6, kv. 29; Lev Mikhailovich Stepochkin, ulitsa Chernoglazovskaya, 11A, kv. 9; Vadim Ivanovich Batozsky, Moskovsky prospekt, 28, kv. 21; Alexandr Iosifovich Khodorov, Sadovy proezd, 1, kv. 89; Jury Petrovich Burchenko, Moskovsky prospekt, 40/42, kv. 14; Vladimir Nikolaevich Sila, Streletsky pereulok, 14A; Garri Moiseevich Korot, ulitsa Timurovtsev, 25A, kv. 100; Adolf Grigorievich Eremenko, ulitsa III Internatsionala, 17, kv. 24; Vitaly Ivanovich Zhuravlev, ulitsa Slinko, 14A, kv. 50, all of Kharkov, U.S.S.R.

[21] Appl. No.: 733,372

[22] Filed: Oct. 18, 1976

[51] Int. Cl.² ............................................. B26D 5/02
[52] U.S. Cl. .................................... 83/92; 83/158; 83/160; 83/167; 83/208; 83/210; 83/215; 83/235; 83/240; 83/251; 83/255; 83/263; 83/268; 83/282; 83/404; 83/449; 83/467 R; 83/517; 83/559; 83/556; 83/649

[58] Field of Search ................. 83/92, 158, 160, 167, 83/208–210, 215, 235, 240, 216, 217, 251, 255, 263, 268, 282, 404, 449, 467, 649, 517, 556, 559, 34, 42

[56] References Cited

U.S. PATENT DOCUMENTS

| | | | |
|---|---|---|---|
| 2,767,789 | 10/1956 | Budlong et al. | 83/556 X |
| 2,989,883 | 6/1961 | Zimsky et al. | 83/34 |
| 3,440,910 | 4/1969 | Scribner | 83/556 X |
| 3,540,120 | 11/1970 | DeLaurentis et al. | 83/217 X |
| 3,603,188 | 9/1971 | Rabl | 83/517 X |
| 3,654,830 | 4/1972 | Werner, Jr. | 83/255 X |
| 3,786,710 | 1/1974 | Backlin | 83/255 X |

*Primary Examiner*—Frank T. Yost
*Attorney, Agent, or Firm*—Lackenbach, Lilling & Siegel

[57] ABSTRACT

The invention relates to automatic lines for cross cutting of coiled strips and is used to best advantage for cross cutting of coiled strips into plates intended for the manufacture of transformers.

The automatic line of this invention comprises guillotine shears which are pivoted in the horizontal plane and intended to cut plates off a strip; non-pivoted guillotine shears intended to cut off sharp angles of said plates, said non-pivoted shears being mounted on a slider which is movable along the automatic line's axis in order to fix the non-pivoted shears at a desired distance from the pivoted shears in order to simultaneously cut off sharp angles and cut out plates; and a strip feeding mechanism being provided with only one pair of rollers driven by means of a reduction gear driven by a step electrohydraulic drive which feeds the strip, as well as accelerates, brakes and, if necessary, reverses the strip's motion to ensure a prescribed plate length.

12 Claims, 6 Drawing Figures

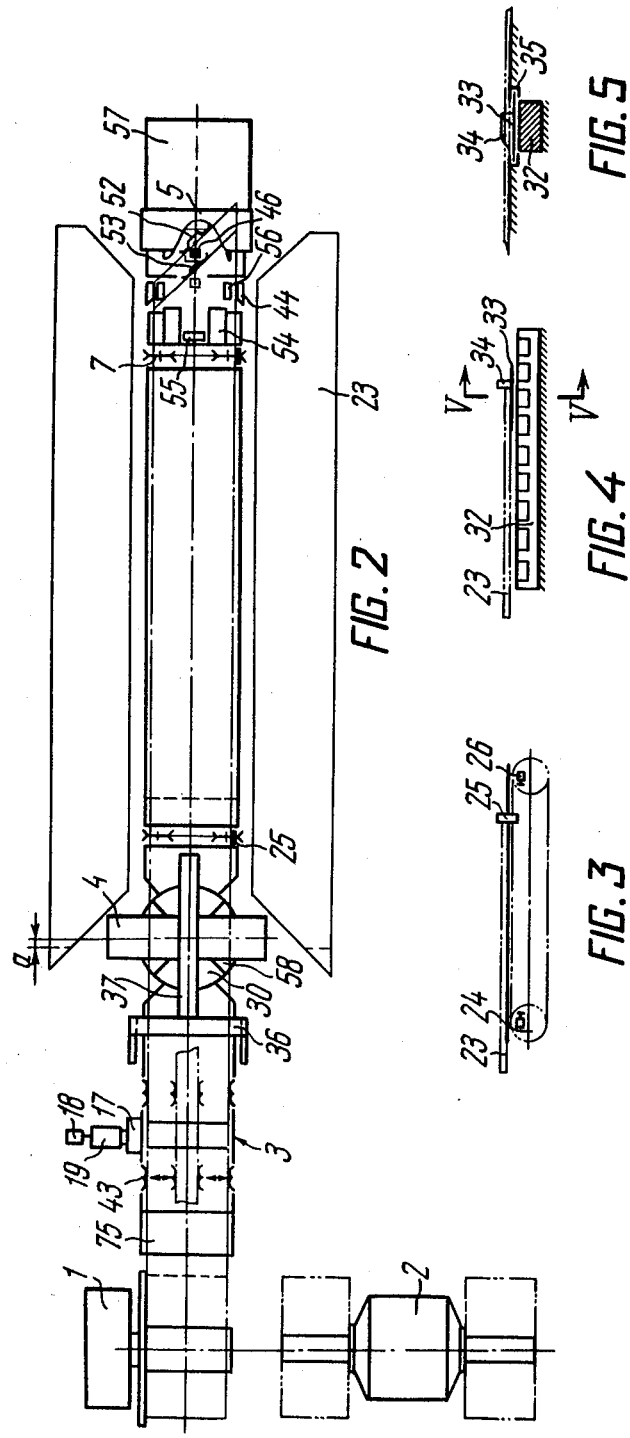

APPARATUS FOR CROSS CUTTING COILED STRIP INTO RECTANGULAR AND OBLIQUE ANGLED PLATES AND CUTTING OFF ACUTE ANGLES

The present invention relates to metal working equipment and, more particularly, to automatic lines for cross cutting of coiled strips. The most effective application of a line in accordance with the invention is for producing magnetic circuit plates from coiled transformer steel strips.

A line's output is largely determined by the design of the strip feeding means. In the line under review, a clip-type feeding means is employed. This means has movable parts of a considerable mass, which limit the stip feeding rate. Besides, this type of feeding means accounts for large dimensions of the line. Despite its drawbacks, this type of feeding means ensures a fairly good accuracy.

In some lines of this type, a feeding means of the roller type is used. The simplest of such means is the one that comprises three pairs of rollers, including rapid and slow feed rollers and reversed feed rollers. The rollers are driven by a conventional asynchronous motor. The accuracy of the feed is ensured by the strip being brought against a stop. As the strip approaches the stop, the speed of its movement is reduced. The end of the stip is brought against the stop at slow speed and locked. In order to guarantee a contact of the strip's end with the stop, the strip is moved a bit too far, so that a wave 200 to 300 mm in height is formed The strip is then stretched in the opposite direction and cut. Such a feeding cycle does not ensure the optimum output, although lines with a roller-type feeding means are more efficient than those with a clip-type feeding means.

In order to increase productivity, some modern lines employ a roller feeding means which includes a measuring roller coupled to a roller control transducer. However, this technical solution involves a number of problems. The measuring roller unit is hard to manufacture, assemble and service, keeping in mind that it is a highly important unit which is meant to ensure a desired accuracy.

In a line which is currently used by a French company, the shears are turned to be brought against a stop. Thus, the plates can only be bevelled within a certain range of angles. Readjustment of the stops is an arduous operation, which requires accurate adjustment and locking of a stop, because the side of a plate has to be accurately bevelled at a required angle. The fact that the shears are necessarily brought against a stop considerably reduces the line's potential.

After the acute angle has been cut off, the plates are removed in the transverse direction, which accounts for an increased length of the line under review.

It is an object of the present invention to provide an automatic line for cross cutting of coiled strips, whose output weuld be considerably higher than that of any conventional installation of this type.

It is another object of the invention to provide an automatic line for cross cutting of coiled strips, which would improve the accuracy and quality of cutting operations.

It is still another object of the invention to provide an automatic line for cross cuting of coiled strips, which would be easy to manufacture and maintain, and which would be marked by high reliability.

It is yet another object of the invention to provide an automatic line for cross cutting of coiled strips, which would be easy to adjust in the course of operation and would thus accurately maintain the prescribed dimensions of plates being cut out with the use of standard equipment.

The foregoing objects are attained by providing an automatic line comprising a strip feeding means, guillotine shears which are pivoted in the horizontal plane and intended to cut plates off the strip, non-pivoted guillotine shears to cut off acute angles, a means for removal of cut-off plates, and a means for receiving and stacking the cut-off plates. The non-pivoted shears are mounted, according to the invention, upon a slider which is arranged behind the pivoted shears in the direction of the strip's movement and adapted for travel in this direction and in the opposite direction in order to fix the non-pivoted shears at a desired distance from the pivoted shears to cut off sharp angles at a desired angle from the angle vertex while simultaneously cutting off a plate. The strip feeding means has a single pair of rollers driven by means of reduction gear driven by a step electrohydraulic drive which feeds the strip, as well as accelerates, brakes and, if necessary, reverses the motion of the strip in order to produce plates of a desired length. The pivoted shears is provided with another step electrohydraulic drive which is coupled to the roller drive so that while the strip is being fed, the shears are turned through a desired angle for cutting off a plate which is thus bevelled at a desired angle.

The foregoing design makes it possible to simultaneously cut off a plate and its acute angles, feed the strip accurately and rapidly in order to cut off a desired length, and turn accurately and rapidly the shears for bevelling a plate at any angle as the strip is being fed. It is important that a change in the bevelling angle does not require any mechanical readjustment of the pivoted shears unit.

The use of the pivoted shears for cutting off sharp angles in combination with the roller strip feeding means reduces the length and simplifies the structure of the line. Cut-off plates are removed from the line in the space between the shears. For this purpose, between the pivoted shears and the non-pivoted shears mounted on the slider, there is arranged a means intended to remove cut-off plates in the direction which is transverse to that of the feed. The shears are provided with horizontal slots in the side walls of the shears' frame.

The means for removal of cut-off plates comprises two kicker mechanisms, one being mounted on the non-pivoted shears, and the other being rigidly secured close to the pivoted shears. Between said kicker mechanisms, there is arranged a band which supports the strip being cut. One end of said band is secured to the slider and its other end is secured to a stationary drum arranged on the pivoted shears.

Thus, it is possible to use two simple mechanisms for the removal of cut-off plates of different length. The movable kicker mechanism travels together with the non-pivoted shears and is thus adjusted for a required plate length; simultaneously, the table, whose function is performed by the strip supporting band, is also adjusted for the required plate length.

In order to rule out any stops or slowdowns of the strip feed, as cut-off plates are being removed, and thus raise the productivity, the kicker mechanisms are arranged, in accordance with the invention, above the strip, each of them being provided with a stop to remove a cut-off plate, said stop having a bevel to rise the strip so that the latter can pass above said stop. The pivoted shears are provided with spring-type members to raise the strip's forward end above the plate that has been cut off and thus make it possible to continue feeding the strip as the cut-off plate is being removed.

The kicker mechanisms may be constructed as line-fed motors, which is the simplest and most reliable solution. In this case, each kicker mechanism is a line-fed motor whose stator is rigidly secured and interacts with a plate being removed which acts as the rotor.

If the electrotechnical properties of the coiled strip being cut do not make it possible to develop a motive force which would be sufficient to kick off a cut-off plate, the function of the motor's rotor may be performed by an intermediate member made of a material possessing the required electrotechnical properties. In this case, each kicker mechanism is, according to the invention, a line-fed motor whose stator is stationary, while its rotor is a metal plate with a stop which interacts with a plate being removed.

In some cases it is necessary to cut off the acute angles of asymmetrical oblique-angled plates whose opposite sides have different rake angles. This operation can be carried out by the pivoted shears which are turned, after the strip has been cut at an oblique angle, so that they are at a perpendicular to the axis of the automatic line, after which the cut-off plate is moved in the longitudinal direction. For this purpose, the line is provided with a gantry-type member arranged in front of the pivoted shears with respect to the direction of the strip's feed and enveloping said strip. Mounted on said gantry-type member is a cantilever which is arranged above the pivoted shears along the axis of the strip and carries a slider with a clamp. Said slider is adapted for travel along the cantilever in order to move a cut-off plate in the direction of the strip's movement, so that acute angles of asymmetrical oblique-angled plates can be cut off by the pivoted shears. The movement of the slider over a prescribed distance corresponding to the length which must be cut off is effected by a step electrohydraulic drive.

This drive rapidly and accurately moves a plate so as to cut off its acute angle at any desired distance from the angle's vertex.

The dimensions of oblique-angled plates are measured with reference to the center line. It is essential that the axis of the strip should coincide with that of the automatic line, otherwise an error is bound to occur as a result of cutting. Upon leaving the decoiling means and before reaching the pivoted shears, the strip is normally centered by side stops. That notwithstanding, the strip may go off the center line while passing between the shears. In order to match the axis of the strip with that of the automatic line in the non-pivoted shears zone, the slider of the non-pivoted shears carries, according to the invention, side stops intended to match the longitudinal axis of the strip with that of the automatic line, and at least one feed error correction device installed before the non-pivoted shears with respect to the direction of the strip movement and adapted for travel along the longitudinal axis of the automatic line. The side stops of the slider of the non-pivoted shears are movable in the vertical direction and adjustable to the strip's width.

The side stops are adapted for travel in the vertical direction so as to be raised as the strip is being fed, and lowered prior to the removal of a cut-off plate.

The reason for using the error correction device is as follows. The roller feeding means and the step drive ensure a prescribed plate size by turning the driven roller through a certain angle corresponding to the given size. An increase in the feed length leads to a greater error due to the slipping of the strip while it passes between the rollers, elastic slipping, inaccurate diameter of the driving roller, etc. The error correction device helps to minimize plate size errors and practically rules out any increase in the error due to an increase in the feed length.

Sometimes it is necessary to cut off alternating plates of different length, for example, plates with and without their acute angles being cut off. In this case, plates have different lengths with reference to their center line. If only one error correction device is used, it has to be moved and thus accurately adjusted for a given size during the automatic operating cycle. In order to increase the line's reliability, the slider carries, in accordance with the invention, two error correction devices arranged symmetrically in relation to the strip feed plane. One of these devices is adapted for movement in the vertical plane.

Each of the error correction devices is adjusted for one plate size. One of the devices remains stationary in the course of cutting, while the other is brought to the strip feed plane when cutting off a shorter plate, and is moved back when the first error correction device is in operation.

According to the invention, there are three embodiments of the error correction device. According to the first embodiment, the error correction device is a transducer of the location of the strip's leading edge, which is electrically connected to the roller drive and initiates a signal for braking this drive and for measuring the braking distance which is equal to the difference between the prescribed plate length and the distance between said transducer and the rotation axis of the pivoted shears.

Prior to the moment the strip passes under the transducer, the roller feeding means operates without measuring the plate size; after this moment, there starts the measurement. As a result the error is accumulated over a limited distance which is equal to the strip braking distance. By moving the transducer in relation to the cutting line of the non-pivoted shears and moving the shears themselves, they can be adjusted for a required plate size and distance from the acute angles' vertex at which these angles are to be cut off.

The transducer must be highly accurate. If this is not the case, the second embodiment of the error correction device is to be used. According to the second embodiment, the error correction device is a spring-loaded stop pivoted in the horizontal plane, its pivoting axis coinciding with the surface of the stop which comes into contact with the leading edge of the strip, which stop is spaced from the pivoted shears at a distance equal to the prescribed plate length. The slider in this case is provided with a clamping means to hold the strip in place when its movement is reversed.

The plate size in this case is somewhat greater than required, but the wave that has been formed is smoothed down by stretching the strip when the roller feed is reversed. Unlike in the case of the conventional three-roller drive means, the wave may be so small as to be equal to the feed error; as a result, the productivity is raised substantially. The fact that the stop is pivoted provides for self-adjustment of its working surface along the oblique edge of the strip.

According to the third embodiment, in front of the pivoted stop and at a certain distance therefrom there is installed a transducer of the location of the leading edge of the strip, which transducer is coupled to the roller drive and initiates a signal to brake said drive and to measure the braking distance. The strip braking distance is greater than the distance between the transducer and said stop.

The way a prescribed plate size is ensured is similar to that of the second embodiment. However, as in the first embodiment, the roller feeding means starts operating as a measuring unit only after the strip's leading edge has passed above the transducer. This simplifies the control system by reducing the counters' capacity.

In order to improve the strip's orientation with respect to the automatic line's axis, the slider is provided with rollers to press the strip against the side stops and the pivoted stop.

Other objects and advantages of the present invention will become more apparent from the following detailed description of a preferred embodiment thereof taken in conjunction with the accompanying drawings, wherein:

FIG. 2 is a plan view of the automatic line of FIG. 1;

FIG. 3 is a cross sectional view taken along the line III—III of FIG. 1;

FIGS. 4 and 5 show different embodiments of the kicker mechanism employed in the automatic line of the present invention.

Figure 1:
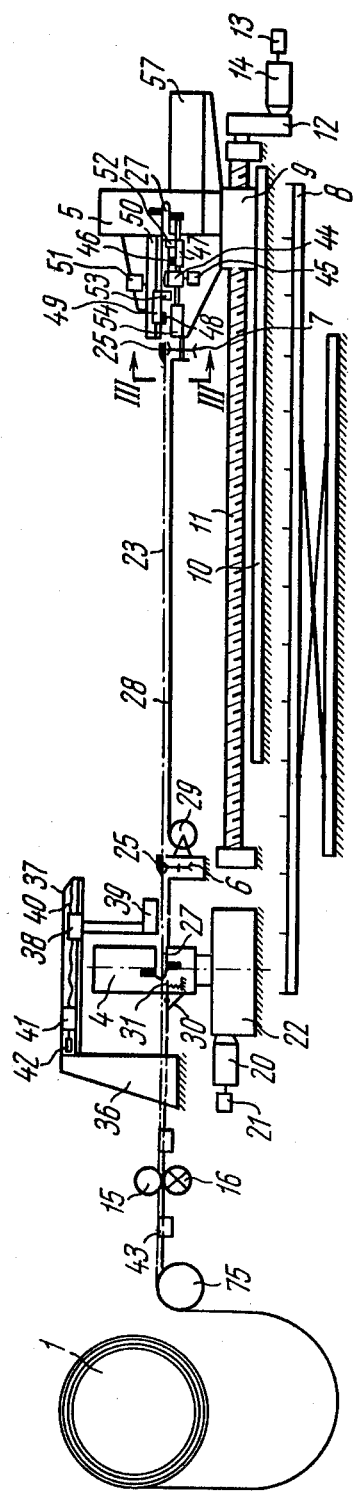
FIG. 1 is a side general view of an automatic line for cross cutting of coiled strips, in accordance with the invention.

Referring now to the attached drawings, the proposed automatic line for cross cutting of coiled strips comprises a strip decoiling means 1 (FIGS. 1 and 2), a coil transfer car 2 intended to load a coil on the means 1, a strip feeding means 3, pivoted guillotine shears 4, non-pivoted guillotine shears 5, a means for the removal of cut-off plates, including kicker mechanisms 6 and 7, and a means to receive and stack cut-off plates, which latter means comprises elevating platforms 8. The non-pivoted shears 5, which are intended for cutting off the acute angles of plates, are mounted on a slider 9 which is arranged behind the pivoted shears 4 in the direction of the strip movement. The slider 9 is adapted for travel along guides 10 with the aid of a lead screw 11, which is driven by means of a reduction gear 12 driven by a step motor 13 and a hydraulic actuator 14. This drive is intended to move the non-pivoted shears in the direction of the strip's movement (along the axis of the automatic line) and fix them at a desired distance from the pivoted shears in order to simultaneously cut off the acute angle and the plate itself.

The strip feeding means 3 comprises a pressure roller 15 and a driving roller 16 coupled by means of a reduction gear 17 to a step electrohydraulic drive which includes a step motor 18 and a hydraulic actuator 19. The step drive of the roller feeding means feeds the strip and accelerates, brakes and, if necessary, reverses the strip's motion to cut off plates of a desired length. A similar drive, comprising a hydraulic actuator 20 and a step motor 21, serves to turn the shears 4 by means of a reduction gear 22 by a desired angle, at which a plate 23 is cut off the strip and chamfered at a desired angle. The shears are turned through a desired angle simultaneously with feeding the strip.

The means for removal of cut-off plates comprises the two mechanisms 6 and 7 arranged between the shears. The kicker mechanism 7 is mounted on the non-pivoted shears 5. The mechanism 6 is identical with the mechanism 7 and is fixed close to the pivoted shears 4. Each of said mechanisms is constructed as a chain gear 24 (FIG. 3) on whose upper run there is mounted a stop 25. The movement of said stop 25 is limited by switches 26. With the aid of the stops 25, each cut-off plate 23 is removed from the automatic line in the direction tranverse to that of the line's motion. Each next plate 23 is removed in the opposite direction.

The shears 4 and 5 (FIGS. 1 and 2) have slots 27 provided in the side supports of the bed in order to remove cut-off plates in the aforementioned direction. The slot in the shears 4 is meant for plates cut off at the right angle.

Between the kicker mechanisms, there is stretched a band 28 which supports the strip being fed. One end of the band 28 is secured to the slider 9 and its other end is secured to a drum 29 mounted on the stationary kicker mechanism 6.

The kicker mechanisms 6 and 7 are arranged under the strip being fed, their stops 25 having bevels so that the strip can be raised and pass above said stops. A semicircular rear table 30 is mounted on the pivoted shears and provided with a spring-type member 31 intended to lift the leading edge of the strip above a plate that has been cut off and thus make it possible to continue feeding the strip as the cut-off plate is being removed.

FIGS. 4 and 5 show an alternative version of the kicker mechanism. This mechanism is constructed as a line-fed motor whose stator 32 is stationary and whose rotor is a metal plate 33 with a stop 34, which plate 33 is adapted for travel along guides 35.

If the electrotechnical properties of the strip being cut make it possible to develop a motive force sufficient to remove a cut-off plate, the plate 33 with the stop 34, and the guides 35 may be dispensed with. In this case, the plate 23 itself serves as the rotor which interacts with the stator 32 of the line-fed motor.

In front of the pivoted shears 4 (FIGS. 1 and 2) there is arranged a mechanism for longitudinally moving a cut-off plate, which mechanism is constructed as a gantry-type means 36 enveloping the strip, whereupon there is mounted a cantilever 37 arranged above the pivoted shears 4 and extending in the direction of the strip's axis. The cantilever 37 carries a slider 38 with a clamp 39 which may be, for example, an electromagnetic clamp. The slider 38 is adapted for travel along the cantilever in order to move a cut-off plate in the direction of the strip's motion, so that the pivoted shears can cut off sharp angles of asymmetrical oblique-angled plates. The slider 38 is driven by a lead screw 40 which is coupled to a hydraulic actuator 41 and a step motor 42.

In order to match the strip's axis with that of the automatic line, provision is made for side stops 43 which can be adjusted for a given strip width. Similar side stops 44 are mounted on the non-pivoted shears 5. The stops 44 are coupled to a pneumatic cylinder 45 which lifts said stops while the strip is being fed and lowers them prior to the removal of a cut-off plate.

In order to improve the accuracy of cutting, the shears 5 are provided with a correction device constructed as a transducer 46 of the location of the strip's leading edge, which transducer 46 is electrically coupled to the step electrohydraulic drive 18, 19 of the strip feeding means 3 and initiates a signal for braking said drive and for measuring the braking distance, which distance is equal to a difference between the prescribed plate length and the distance between the transducer 46 and the pivoting axis of the pivoted shears 4. The transducer 46 is mounted on a slider 47 which is arranged in front of the non-pivoted shears and adapted for travel along the axis of the automatic line. An identical correction device, constructed as a transducer 48, is mounted on an upper slider 49 whose guides 50 can be lifted by a pneumatic cylinder 51.

According to another embodiment, the correction devices are constructed as spring-loaded stops 52 and 53 which are pivoted in the horizontal plane and are mounted on the lower slider 47 and upper slider 49, respectively (the upper stop 53 is conventionally shown in FIG. 2). The pivoting axes of the stops 52 and 53 coincide with their working surfaces which are in contact with the leading edge of the strip. These stops are spaced from the axle of the pivoted shears at a distance equal to a prescribed plate length.

According to a third embodiment, the present invention contemplates the joint use in the correction devices of the stops 52 and 53 and the transducers 46 and 48 of the location of the strip's leading edge. In this latter case, the stip braking distance, which is measured, is greater than the distance between the transducer and the stop, the axes of the stops being spaced from the axle of the pivoted shears at a distance which is equal to a preselected plate length.

The slider 9 is provided with a clamping means constructed in the form of magnetic plates 54 intended to hold the strip in place as it reverses its motion, as well as a longitudinal roller 55 and two side magnetic rollers 56 which serve to accurately place the strip with respect to the stops 44, 52 and 53. Finally, provision is made for a bin 57 to collect cut-off sharp angles of plates.

In order to remove the cut-off portions of sharp angles, the table 30 is provided with sectors 58 that are pivoted in the horizontal plane. The bins in which cuttings are collected are not shown in the drawings.

The automatic line control system comprises a unit 59 (FIG. 6) for controlling the step motor 18 of the roller feeding means 3; a unit 60 for controlling the step motor 21 of the pivoted shears 4; a unit 61 for controlling the step motor 42 of the mechanism for longitudinally moving a cut-off plate; a unit 62 for controlling a drive 63 of the strip decoiling means 1; a unit 64 for controlling the rest of the automatic line's mechanisms, for example, the kicker mechanisms 6 and 7 and the mechanisms of the shears 4 and 5; a plate length measuring unit 65; a shears pivoting angle measuring unit 66; a unit 67 for measuring the longitudinal displacement of a cut-off plate; a program unit 68; a plate length setting unit 69; a plate chamfer angle setting unit 70; a plate longitudinal displacement setting unit 71; and a plate shape setting unit 72.

The units 59, 60 and 61 ensure smooth acceleration, rotation at a prescribed speed, and smooth braking of the respective step motors by signals arriving from the program unit 68.

The circuitries of the units 59, 60 and 61 are identical. Each of these units comprises a controlled pulse generator, a control signal former, and a pulse distributor. From the output of the generator, pulses are applied via the pulse distributor to the respective step motor. The control signal former may comprise, for example, a counter, to whose input there are applied pulses from a clock pulse generator and a number-to-voltage converter. As a control signal is applied to the controlled pulse generator, the selected type of number-to-voltage conversion is to change the pulse frequency at the output of said generator so as to ensure smooth acceleration and braking of the drive over the shortest possible period of time required for smooth operation of the mechanisms.

The pulse distributor comprises a shift register, a decoder and amplifiers and ensures the necessary current commutation in the step motor windings when pulses are applied thereto from the controlled pulse generator.

The units 65, 66 and 67 count the number of pulses arriving to the respective step motors and commutate them in accordance with the values set by the units 69, 70 and 71.

Each of the units 65, 66 and 67 comprises a pulse counter and a comparison circuit. The counter counts the pulses applied to the step motor. The result of the count is compared to the number set by the respective setting unit, and if the two values are equal, there is initiated a signal which is applied to the respective control unit (59, 60 and 61). This signal stops the sending of pulses to the step motor. The same signal is applied to the program unit and indicates the end of a given displacement.

The unit 62 for controlling the drive 63 of the strip decoiling means ensures the rotation of the coil at a prescribed speed and the formation of a compensation loop before the strip feeding means 3.

The unit 62 includes drive speed adjustment circuits which changes the speed of the drive, depending upon the size of the compensation loop, which is determined, for example, by photocells. The unit 62 also includes means to control the drive under adjustment conditions.

The unit 64 energizes electromagnets 73, including the electromagnets of the valves of the pneumatic cylinders 45 and 51, and the valves of the cylinders which are not shown in the drawings and which control the elevating platforms 8, pivoted sectors 58, etc.

The unit 64 also controls the electromagnets 39 and 54, the motors of the kicker mechanisms 6 and 7, and the mechanisms of the shears 4 and 5, which are normally built around hydraulic cylinders; and unit 64 still further controls some mechanisms of the strip decoiling means 1, for example, the grip loosening mechanism, etc.

The unit 64 comprises AND, OR and NOT logical circuits, memory cells, time interval and signal delay setting means, and amplifiers which make it possible to form control signals by instructions arriving from the program unit, as well as to link the execution of these instructions with the mutual positioning of the automatic line's mechanisms. For instance, the direction of plate removal is determined by the direction in which the shears are turned prior to cutting, etc.

The program unit 68 forms a sequence of control pulses sent to the other units of the system to carry out different operations of the cutting cycle in accordance with the prescribed plate shape and size.

The program unit 68 comprises pulse distribution means built around counters and decoders, as well as AND, OR and NOT logical circuits which form control instructions for cutting out plates of different shapes. The selection of instruction sequences is determined by the state of the setting unit's switches, as well as plate dimensions and configurations.

The sequence of said pulses is also determined by the positioning of the automatic line's mechanisms. Information on the positioning of the line's mechanisms is entered in the program unit 68 with the aid of the transducers 74. This group of transducers includes, for example, the switches 26 of the kicker mechanisms 6 and 7, as well as some transducers which are not shown in the drawings. The latter include transducers of the position of the side stops 44, transducers of the guides 50, transducers of the extreme positions of the sliders 9 and 38, transducers of the extreme positions of the elevating platforms 8, pivoted sectors 58, etc. The group 74 of transducers also includes transducers of the size of the compensation loop.

Figure 6:
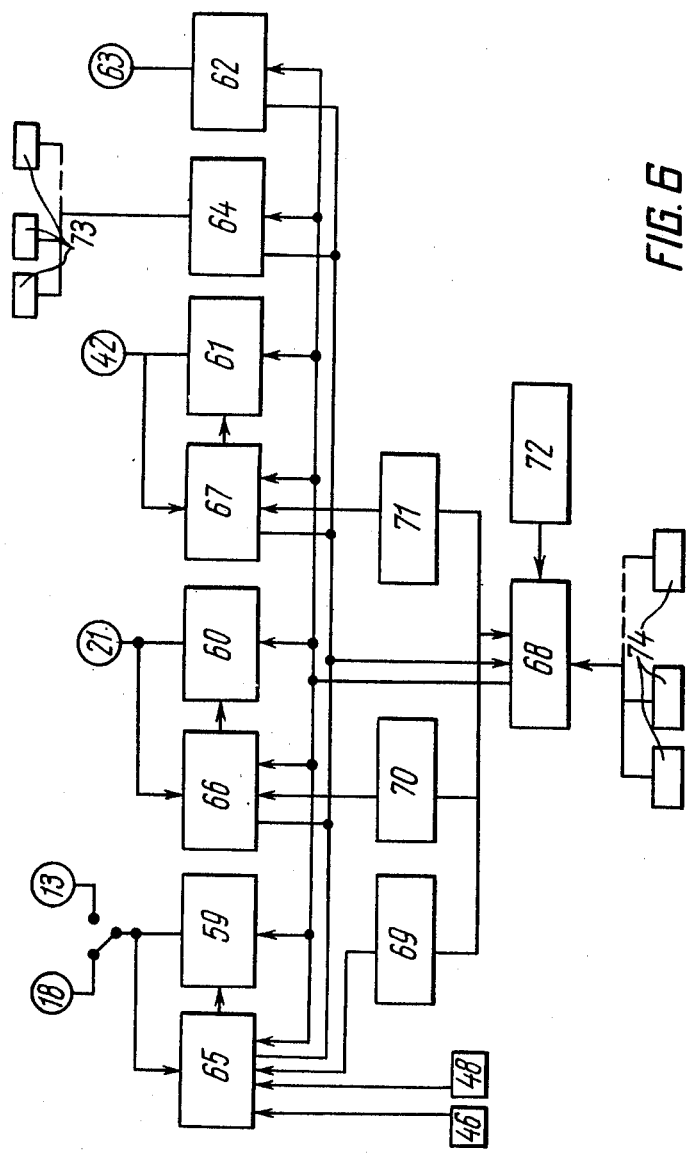
FIG. 6 is a block diagram of the line's control system.

The slider 9 of the non-pivoted shears 5 is moved only in the course of adjusting said shears 5 for cutting out plates of a prescribed size. As shown in FIG. 6, the step motor 13 of this slider's drive can be controlled by the units 58, 65 and 69 which control the roller feeding means and which are connected to the step motor 13 to control said slider 9.

The function of the setting units 69, 70 and 71 may be performed, for example, by decade switches connected to the comparison circuits of the units 65, 66 and 67 and to the logical circuits of the program unit 68.

The automatic line of the present invention operates as follows.

Prior to bringing the automatic line into action, the following adjustment operations are performed. With the aid of the car 2, the coil is placed on the decoiling means 1. The end of the coiled strip is introduced past a drum 75 into the automatic line. The side stops 43 and 44 are adjusted for a given strip width (FIG. 2 conventionally shows the positioning of the stops 43 for cutting a narrow strip). The shears 5 are moved along the guides 10 and fixed in relation to the shears 4 as required by the prescribed plate length. The band 28 is either wound around or unwound from the drum 29. Information on the plate size and shape is entered in the control system.

After the foregoing operations have been completed, the shears 4 are turned through an angle at which the first plate is to be chamfered. The strip then reaches the shears 4, and its leading edge is cut off. In the course of adjustment, the stops 25 of the kicker mechanisms 6 and 7 are found in one of their extreme positions which corresponds to the direction of the removal of the first plate.

At this point, the preparation of the automatic line for operation is completed, and the line starts operating automatically.

The roller feeding means 3 ensures a prescribed plate size, and the shears 4 are turned to ensure a required chamfer angle. The units 59 and 60 form sequences of pulses applied to the respective step motors. The units 65 and 66 count pulses applied to the step motors. Upon counting a certain number of pulses, which corresponds to the prescribed plate length and chamfer angle, said units 65 and 66 initiate signals which are applied to the units 59 and 60 and discontinue the sending of pulses.

As this takes place, the shears 4 and 5 cut out the plate and cut off its acute angle. The stops 25 move from one extreme position to the other and move the plate 23 onto the platform 8, after which they assume their initial position for the removal of the next plate in the opposite direction. As the cut-off plate is being removed, everything is readjusted for the size of the following plate, and the shears 4 are turned accordingly. The stops 25 (FIG. 1) are bevelled, so that they do not hamper the feeding of the strip during the removal of the cut-off plate. The edge of the strip is raised above the plate 23 by the spring-type member 31. The operation of the kicker mechanisms and the shears' drive is timed so as to ensure smooth functioning of the automatic line.

For cutting rectangular plates, the shears are not turned. Cut-off plates are removed through the slots provided in the shears.

If the kicker mechanisms are built around line-fed motors, plates are removed either by the stops 33 (FIGS. 4 and 5) or without resorting to any stops. In the latter case, a plate acts as a rotor and interacts with the stators 32 of the line-fed motors.

Normally, the acute angle is cut off only at one side of a plate. If a plate has equal chamfer angles on both sides, this operation is performed by the shears 5. If a plate is asymmetrical, the sharp angle has to be cut off on the side of the pivoted shears. In this case, after a plate has been cut off, its edge is caught by the magnet 39. The slider 38 and the step electrohydraulic drive 41, 42 then push the plate forward by a distance "$a$" (FIG. 2); the roller feeding means moves the strip back by the same distance. The shears 4 are turned so that they extend perpendicularly to the axis of the automatic line, and the acute angles of two plates are cut off at the same time. The shears 5 are idle.

Acute angles of asymmetrical plates can be cut off in a different manner. The slider 38 moves the plate over a distance "$a$." The strip's motion is reversed so that the strip is fully withdrawn from under the shears 4. The sharp angle of the displaced plate is cut off. The sharp angle of the next plate is cut off by the shears 5, while the shear 4 are cutting out the plate itself. This operating cycle is possible because as far as the next plate is concerned, the acute angle has to be cut off only on its front edge.

The units 61 and 67, which control the step motor 42 of the mechanism for longitudinally moving the plate, operate as the units for controlling the roller feeding means and pivoted shears.

If the roller feeding means cannot satisfy the accuracy requirements, the error correction device is brought into play. Prior to the start of operation of the automatic line, in the course of the adjustment procedure, the error correction device is adjusted for a given plate size. (The distance between the cutting line of the shear 5 and the error correction device determines the line along which the sharp angle is to be cut; the distance between the correction device and the pivoting axis of the pivoted shears determines the length of the plate along the center line). If the correction device is a transducer, the cutting cycle is as described above. The only difference is in the operation of the system for controlling the drive of the roller feeding means. Before the leading edge of the strip being cut reaches the transducer, no counting takes place, whereafter there is measured the braking distance which is equal to the distance between the transducer and the point at which the strip stops. (The braking distance is equal to the difference between a given plate length and the distance from the transducer to the pivoting axis of the pivoted shears).

The plate length measuring unit 65 is brought into play by a signal from the transducer 46. As a result, a number of pulses, which corresponds to the given braking distance, is applied to the step motor.

If the correction device is constructed as the stop 52, the feeding is done as follows. The roller feeding means is adjusted so that the plate size is somewhat greater than required. The difference between the actual plate size and the required size is entered in the control system and is the maximum possible error. The edge of the strip reaches the stop 52. Due to the fact that said stop 52 is pivoted in the horizontal plane, the edge of the strip is self-oriented with reference to the stop 52 and one of the side stops 44. As a result, there is formed a wave whose height corresponds to the difference between the actual plate size and the required plate size (the prescribed plate size is equal to the distance between the stop 52 and the shears 4). The magnets 54 are then brought into play and hold the edge of the strip. The strip's motion is reversed. The strip is straightened out, the wave disappears, and the shears 4 and 5 are brought into play. The magnets 54 are de-energized, the stops 44 are lowered, and the cut-off plate is removed from the automatic line.

The above operating cycle remains the same in the case when the correction device is composed of a self-adjustment stop and a transducer. The difference is that the plate size measurement starts when the strip is passing under the transducer 46. Said transducer 46 initiates a signal to brake the strip and measure the braking distance, which braking distance is in excess of the distance from the transducer 46 to the stop 52 which is spaced from the pivoting axis of the shears 4 at a distance equal to the prescribed plate length.

If it is necessary to alternately cut out plates of different length, the upper correction device is brought into play. This device is lowered by the pneumatic cylinder 51 when a shorter plate arrives, and raised when the next plate arrives. If no correction devices are used in the course of alternately cutting out plates of different length, the roller feeding means operates so as to alternately ensure said different plate lengths. In this case, the upper correction device is lifted so as not to impede the strip feeding and the removal of cut-off plates. The lower correction device is withdrawn over the cutting line of the shears 5. The middle zone of the cutting line of the shears 5 along the axis of the automatic line is a non-working zone, because the cathetus of the triangle being cut off is shorter than one half of the plate's width. It is possible, therefore, to provide a recess in the shears 5 along the automatic line's axis, which recess is to accomodate the lower correction device.

The rollers 55 and 56 serve to improve the orientation of the strip with reference to the stops 44, 52 and 53. The rollers 56 press the strip towards the respective side stop. The roller 55 rotates in the direction of the strip's feed and thus presses the strip more firmly against the stops 52 and 53.

What is claimed is:

1. An automatic line for cross cutting a coiled strip into rectangular and oblique-angled plates and for cutting off sharp angles, comprising, in successive arrangement: decoiling means; a drive means for linearly moving the strip being decoiled; pivoted guillotine shears for cutting plates off the strip at an adjustable angle in the strip's plane; non-pivoted guillotine shears for cutting off sharp angles at a constant angle to the direction in which the strip is being fed; means for the removal of cut-off plates from the zone between said shears; means to receive and stack the cut-off plates; means for adjustable displacement of said non-pivoted shears in the zone downstream of said pivoted shears in the direction of the strip feed in order to ensure a prescribed distance between said shears and to cut off sharp angles simultaneously with cutting off plates; said means for moving said strip being provided with a pair of driven rollers which are set into rotation by a first step electrohydraulic drive by means of a reduction gear; pulse means to control said first step electrohydraulic drive to accelerate, feed, and brake said strip, as well as to reverse its motion, all with the aid of the same driven rollers, in order to ensure a prescribed plate length; a second step electrohydraulic drive for said pivoted shears, said second step electrohydraulic drive controlling the angle at which said pivoted shears are arranged with respect to the strip's plane; means to synchronize the operation of both said step electrohydraulic drives connected to said drives for turning said pivoted shears through a prescribed angle simultaneously with feeding the strip by the driven rollers, whereby a plate is cut off the strip and is at the same time chamfered at a prescribed angle.

2. An automatic line as claimed in claim 1, wherein said means for the removal of cut-off plates comprises two kicker mechanisms, one of which is mounted on said non-pivoted shears, whereas the other is rigidly secured close to the pivoted shears, there being arranged between said kicker mechanisms a strip supporting band, one of its ends being secured to a slider, while the other is fastened to a stationary drum arranged close to the pivotal shears.

3. An automatic line as claimed in claimed 2, wherein said kicker mechanisms are arranged under the strip being fed, each of said kicker mechanisms being provided with a stop for moving a cut-off plate, said stop being bevelled in order to raise the strip being fed so that it can pass above said stop, the pivoted shears being provided with spring-type members to raise the leading edge of the strip above the cut-off plate and thus make it possible to continue feeding the strip, while the cut-off plate is being removed.

4. An automatic line as claimed in claim 2, wherein each kicker mechanism is a line-fed motor whose stator is stationary and interacts with a plate being removed, said plate performing the function of the rotor.

5. An automatic line as claimed in claim 2, wherein each kicker mechanism is a line-fed motor whose stator is stationary and whose rotor is a metal plate with a stop interacting with a cut-off plate being removed.

6. An automatic line as claimed in claim 1, which is provided with a gantry-type member arranged before the pivoted shears, with respect to the direction of the strip feed, and enveloping said strip, said gantry-type member carrying a cantilever arranged above the pivoted shears and extending along the strip's axis, said cantilever carrying a slider with a clamp, said slider being movable along said cantilever in order to move a cut-off plate in the direction of the strip feed, in order to permit a sharp angle of an asymmetrical oblique-angled plate to be cut off by the pivoted shears, the displacement of said slider by a prescribed distance corresponding to the size of the sharp angle to be cut off being effected by a step electrohydraulic drive.

7. An automatic line as claimed in claim 1, wherein said non-pivoted shears are mounted on a slider which carries side stops that are movable in the vertical direction and adjustable for the strip's width, said side stops being intended for orientating the strip with respect to the longitudinal axis of the automatic line, said automatic line also being provided with feed error correction means arranged before the non-pivoted shears, relative to the direction of the strip feed, and being movable along said axis.

8. An automatic line as claimed in claim 7, wherein said slider carries means for correcting the length of a plate being cut off, said means being arranged symmetrically in relation to the plane of the strip feed, one of said means being movable in the vertical plane.

9. An automatic line as claimed in claim 8, wherein said correction means is a transducer of the location of the strip's leading edge, said transducer being electrically connected to the drive of the rollers and producing a signal to brake said drive and to measure the braking distance which is equal to the difference between a prescribed plate length and the distance between said transducer and the pivoting axis of the pivoted shears.

10. An automatic line as claimed in claim 7, wherein said correction means is constructed as a spring-loaded stop pivoted in the horizontal plane, the pivoting axis of said stop coinciding with the stop's surface which is in contact with the leading edge of the strip, said stop being spaced from the pivoting axis of the pivoted shears at a distance which is equal to a prescribed plate length, the slider being provided with clamp means to hold the strip when its motion is reversed.

11. An automatic line as claimed in claim 7, wherein on the slider there are mounted rollers to press the strip to the side stops and the pivoted stop.

12. An automatic line as claimed in claim 10, wherein the location of said stop corresponds to a prescribed plate length, a transducer for locating the strip's leading edge being arranged before said stop and at a certain distance therefrom, said transducer being connected to the drive for said rollers moving said strip and producing a signal to brake said drive and to measure the braking distance, the strip's braking distance being greater than the distance between said transducer and said stop.

* * * * *